(12) United States Patent
Brown et al.

(10) Patent No.: US 9,286,193 B2
(45) Date of Patent: Mar. 15, 2016

(54) PRIORITIZATION AND ASSIGNMENT MANAGER FOR AN INTEGRATED TESTING PLATFORM

(75) Inventors: Julian M. Brown, London (GB); Peter J. Smith, London (GB); Stephen M. Williams, Warrington (GB); Jason A. Steele, London (GB)

(73) Assignee: Accenture Global Services Limited, Dublin (IE)

( * ) Notice: Subject to any disclaimer, the term of this patent is extended or adjusted under 35 U.S.C. 154(b) by 56 days.

(21) Appl. No.: 13/444,517

(22) Filed: Apr. 11, 2012

(65) Prior Publication Data

US 2012/0266023 A1   Oct. 18, 2012

Related U.S. Application Data

(60) Provisional application No. 61/474,516, filed on Apr. 12, 2011.

(51) Int. Cl.
*G06F 9/44*    (2006.01)
*G06F 11/36*   (2006.01)

(52) U.S. Cl.
CPC ........ *G06F 11/3664* (2013.01); *G06F 11/3684* (2013.01)

(58) Field of Classification Search
CPC .............. G06F 11/362; G06F 11/3688; G06F 11/3684; G06F 11/3672; G06F 11/3664
USPC .......................................... 717/124
See application file for complete search history.

(56) References Cited

U.S. PATENT DOCUMENTS

| 6,088,664    | A    | 7/2000  | MacPherson              |
|--------------|------|---------|-------------------------|
| 7,231,210    | B1   | 6/2007  | Croak et al.            |
| 2003/0055705 | A1*  | 3/2003  | Kilpatrick ........................ 705/9 |
| 2003/0236775 | A1   | 12/2003 | Patterson               |
| 2004/0103396 | A1*  | 5/2004  | Nehab ........................... 717/127 |
| 2006/0041864 | A1*  | 2/2006  | Holloway et al. ............. 717/124 |
| 2006/0112388 | A1*  | 5/2006  | Taniguchi et al. ............ 718/100 |
| 2007/0094541 | A1   | 4/2007  | Kang                    |
| 2007/0094542 | A1*  | 4/2007  | Bartucca et al. ................ 714/38 |
| 2009/0265681 | A1*  | 10/2009 | Beto et al. ...................... 717/100 |
| 2011/0066490 | A1*  | 3/2011  | Bassin et al. ................ 705/14.48 |
| 2011/0307860 | A1*  | 12/2011 | Park et al. ..................... 717/107 |

FOREIGN PATENT DOCUMENTS

WO   WO 2004/068347 A1   8/2004

OTHER PUBLICATIONS

Chinese Office Action from corresponding Chinese Patent Application No. 201210109918.0 dated Jul. 2, 2014.

* cited by examiner

*Primary Examiner* — Li B Zhen
*Assistant Examiner* — Hui-Wen Lin
(74) *Attorney, Agent, or Firm* — Brinks Gilson & Lione

(57) ABSTRACT

A method of prioritizing and assigning test scripts is provided in a testing platform configured to organize, manage, and facilitate the debugging of test scripts. The test scripts are used in testing software modules. The method includes receiving a plurality of test scripts, applying a predetermined set of factors to each test script, and assigning a weight value to each factor based on a relative importance of the factor. A priority value is set for each test script based on the weighted factors, and the test script is assigned to a queue position for execution based on the corresponding priority value, where the assigned test script is associated with one or more bias factors. The test script is then selected from the testing queue and forwarded if the bias factors indicate that requirements of the test script match corresponding bias factors of the testing individual.

21 Claims, 10 Drawing Sheets

PRIORITIZATION AND ASSIGNMENT MANAGER FOR AN INTEGRATED TESTING PLATFORM

CLAIM OF PRIORITY

This application claims the benefit of U.S. Provisional Patent Application Ser. No. 61/474,516 filed Apr. 12, 2011, which is incorporated by reference in its entirety herein.

BACKGROUND OF THE INVENTION

1. Technical Field

This disclosure relates to software testing, and in particular, this disclosure relates to an integrated platform for developing, debugging, and executing tests to insure the integrity and functionality of software systems.

2. Background

The development of computer software involves a rigorous testing process to insure that the software functions as intended. During the testing process, testers write various test scripts for performing different types of tests necessary to ensure that the computer software is functioning as designed. The testers also set up and run the test scripts while tracking the results, and report the test result to appropriate personnel. This process is inefficient and time consuming, and requires significant tester involvement.

Further, as businesses continue to rely on computer software and complex software packages, an increasing number of highly complex computer software has been developed to meet business demands. Due to the increased complexity and scale, such software programs require a large-scale testing process involving far more testers and test scripts than were required previously. Such increases are related to organizations centralizing their testing and moving to an outsourced testing model. Traditionally testing was 'embedded' into the systems development life cycle (SDLC) for each project, but now central 'discrete' testing functions exist within organizations, which test across multiple projects and releases.

Testing tools have been developed to assist the testers in performing the various steps of the testing process. However, existing testing tools are not able to provide the required functionality and efficiency to overcome the challenges posed by the large-scale testing process.

Testing of various products and/or software products has increased in complexity and scope. In the past, relatively small groups of designers and developers, perhaps 10 to 30 in number, developed various tests for testing and verifying the function of software modules or code segments. Such small groups of individuals have been manageable. However, as the number of individuals contributing to the project becomes large, redundancy and complexity increase, which contributes to increased cost and an increase in the number of errors. Therefore, a need exists to address the problems noted above.

SUMMARY

The next generation testing (NGT) system provides a managed service platform for centralized development, debugging, and implementation of software testing, where hundreds to perhaps thousands of individuals can collaborate in developing and implementing a very large array of modules or test scripts that form a suite of tests. The next generation testing system is not limited only to testing of software modules, and may be used for the testing of hardware as well, provided that test result signals and indicators that reflect the state of the hardware are provided to the testing system.

For example, the next generation testing system may be used by an organization or software development house to test and verify the function and operation of a large software package or application, or set of applications, such as an accounting system, an invoicing system, an operating system version release, or any other system. The next generation testing system may be used in a test "factory" where many hundreds of individuals perform final tests or quality control tests on the same or similar products, for example, a PC operating system testing prior to release.

The next generation testing system may be used to develop and debug the tests, and may also be used to implement the final testing procedures to verify the release or final quality control of an actual product undergoing testing prior to shipping. The next generation testing system may be used to a) plan and develop the testing of a product for release, b) plan and estimate the effort or manpower required to develop the testing process, c) manage the preparation process, d) manage the distribution of the test scripts to the testing personnel, and e) automate the test process.

A method of prioritizing and assigning test scripts is provided in an integrated testing platform, where the testing platform is configured to organize, manage, and facilitate the debugging of test scripts prepared by a testing individual. The method includes receiving a plurality of test scripts, applying a predetermined set of factors to each test script, and assigning a weight value to each factor based on a relative importance of the factor. A priority value is set for each test script based on the weighted factors corresponding to the test script, and the test script is assigned to a queue position for execution based on the corresponding priority value, where the assigned test script is associated with one or more bias factors. A selected test script is then identified from the testing queue and forwarded to a testing individual if the bias factors indicate that requirements of the test script match corresponding bias factors of the testing individual. The test script may be assigned in real-time when the tester clicks a 'get next' icon.

Other embodiments of systems, methods, features, and their corresponding advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and the description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
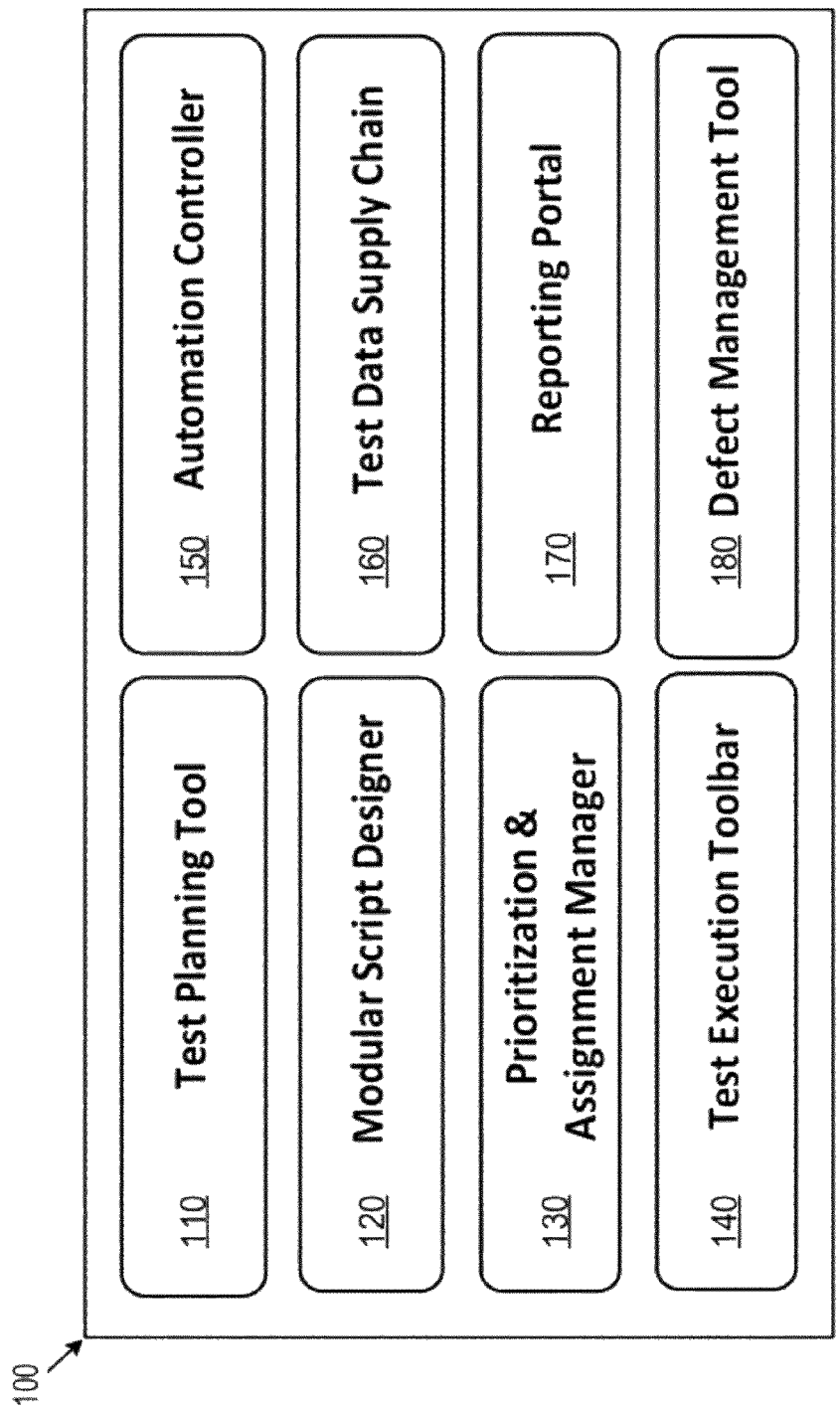
FIG. 1 is a high-level block diagram showing a specific embodiment of the primary components of a next generation testing system.

FIG. 1 is a high-level block diagram showing eight components of a next generation testing system 100, which includes a test planning tool 110, a modular script designer 120, a prioritization and assignment manager (PAM) 130, a test execution toolbar 140, an automation controller 150, a test data supply chain controller 160, a reporting portal 170, and the defect management tool 180. The next generation testing system 100 may be a suite of tools that are integrated with existing or underlying basic test tools. Thus, the next generation testing system 100 does not necessarily replace existing management and development tools, but rather augments and extends the capability of such existing tools. The next generation testing system 100 acts as a layer on top of existing management and development tools.

Figure 2:
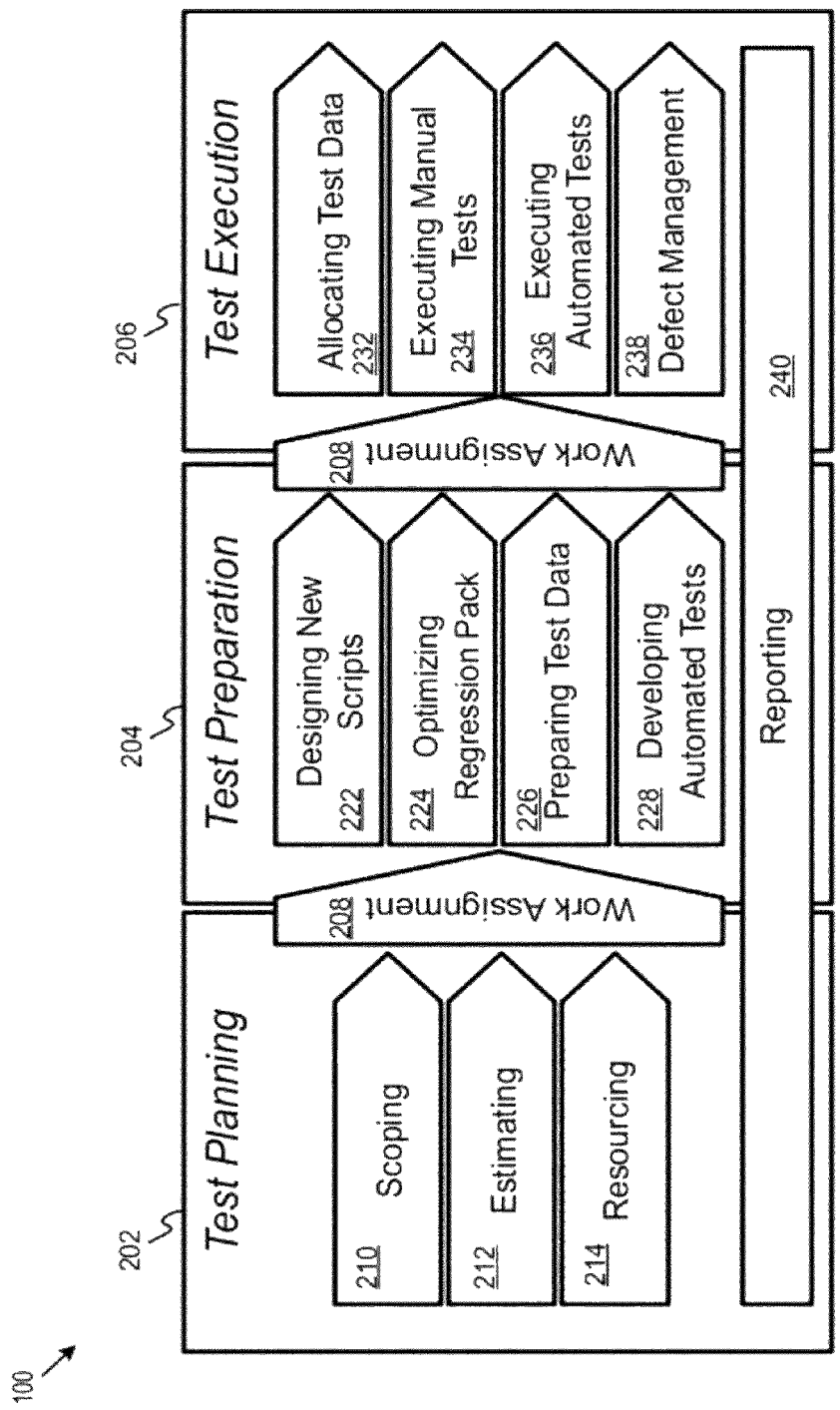
FIG. 2 is a pictorial diagram showing additional features of the next generation testing system.

FIG. 2 is a diagram of an overall testing process using the next generation testing system 100. The testing process may include a test planning stage 202, a test preparation stage 204, and a test execution stage 206. Transitioning from the test planning stage 202 to the test preparation stage 204, and from the test preparation stage 204 to the test execution state 206 may involve work assignment 208. The test planning stage 202 may include scoping 210, estimating 212 and resourcing 214. The test preparation stage 204 may include designing new scripts 222, optimizing regression pack 224, preparing test data 226, developing and developing automated tests 228. The test execution stage 206 may include allocating test data 232, executing manual tests 234, executing automated tests 236, and defect management 238. The next generation testing system 100 may also include reporting capability 240 throughout all stages of the testing process. The next generation testing system 100 may provide increased efficiency and functionality across all stages of testing.

Turning back to FIG. 1, the test planning tool 110 estimates and plans the preparation, work and manpower requirements involved in the start of a particular software release. The test planning tool 110 provides an indication of the plurality of skill sets required to test the various test scripts, and the different skill groups associated with the testing personnel available. The test planning tool 110 also provides assisted estimation. The test planning tool may use a three stage process to provide estimation at increasing levels of accuracy. Information is used from previous releases to improve estimates. Pluggable architecture for client-specific calculations may be used. The test planning tool 110 also provides deconstruction of requirements into tests.

The test planning tool 110 assists the user in breaking down requirements into a required number of tests. Collaborative working capabilities allow a 'divide and conquer' approach. The test planning tool 110 further provides resource forecasting by skill. Early foresight of skills required to support the testing activities is made possible, and graphical display of availability versus demand may be presented. The test planning tool 110 further helps to shape the test organization by promoting cross-skilling. The test planning tool 110 also provides regression pack suggestions. Using a meta-data driven approach, the system suggests an appropriate regression pack. Risk-based testing scores can be used to size the pack accordingly. The test planning tool 110 essentially quantifies what items need to be tested, what skill sets are required to perform the tests, and whether the required skill sets are present in the resources provided.

The modular script designer 120 is used to design new tests or test scripts in a modular way, and increases the efficiency of the testing effort and the organization by maximizing the benefit of test scripts that have been written by other designers, engineers, or testing individuals. This avoids redundancy by reusing test scripts that others have created, and which have been functionally verified.

The modular script designer 120 provides for re-use of modules rather than complete scripts, as a test script is composed of several test modules, and where each module represents a logical part of a test, for example, a login to an application.

Each test script created by a testing individual or test creator using the modular script designer 120 includes associated data corresponding to approval history of the test script and the functional location or hierarchy of the test script with respect to other test scripts that are executed before and after the test script at issue. The associated data for a test script also includes a description of the function of the test script and a description identifying the products for which the test script is used.

Once a test script has been designed using the modular script designer 120, it is saved and eventually uploaded to the standard test tool, which is a separate and independent commercially available testing device or system used by the next generation testing system 100. As mentioned above, the next generation testing system 100 does not replace the low-level or basic testing tool. For example, the basic testing tool may be a Hewlett Packard HP Quality Center™ testing tool, IBM Rational Quality Manager, or other commercially available basic testing tool, which may run under the control and direction of the next generation testing system 100. The next-generation testing system 100 is integrated with all of the various basic testing tools and allows communication to and from the various basic testing tools.

Figure 3:
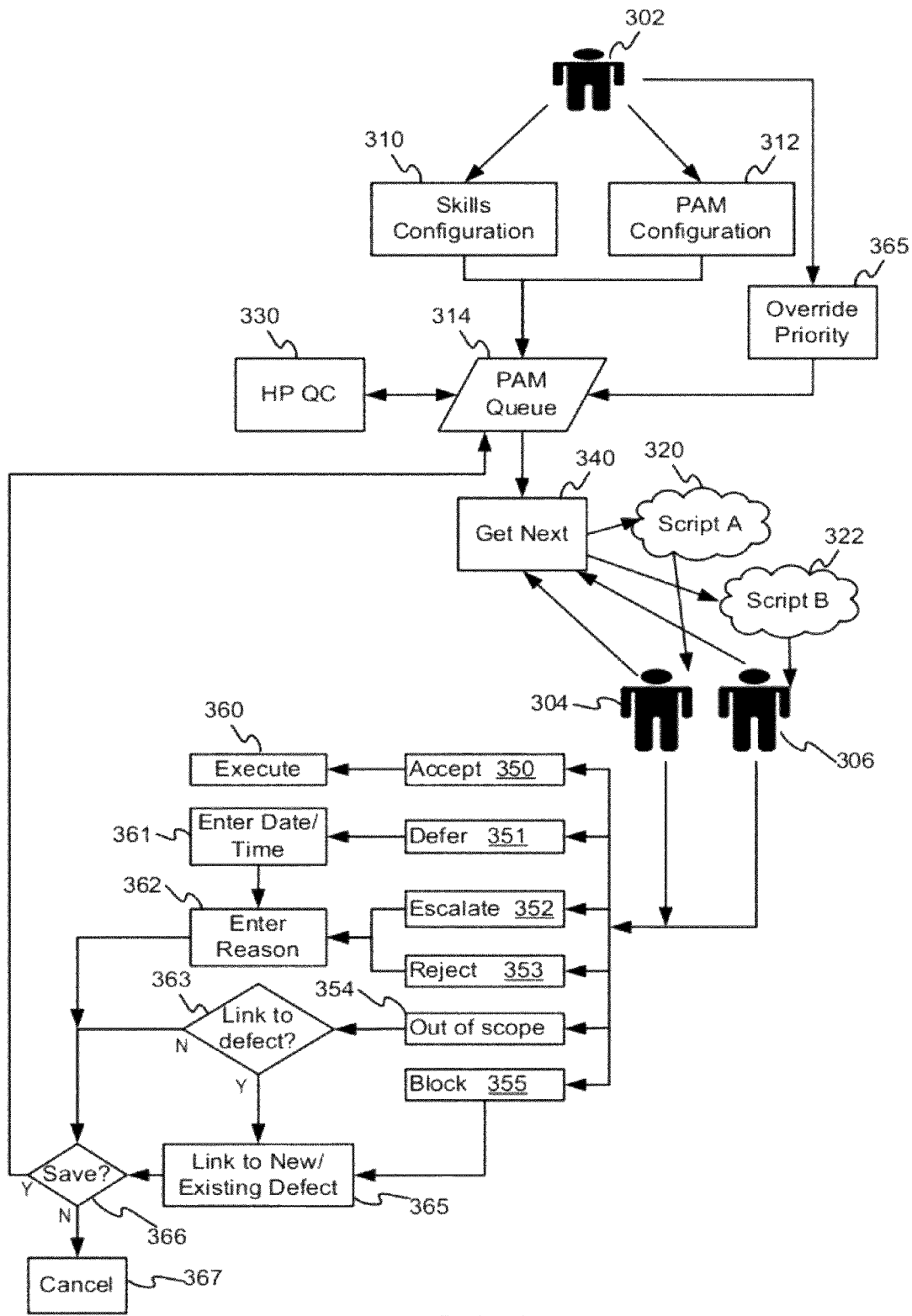
FIG. 3 is a pictorial diagram showing data flow and operational processes of the next generation testing system.

FIG. 3 is a logical diagram of an embodiment of the prioritization and assignment manager 130. Users of the prioritization and assignment manager 130 may include a test lead person 302 and testers 304 and 306. The prioritization and assignment manager 130 receives skills configuration information 310 and PAM configuration information 312 from the test lead 302. The skills configuration may include information such as the test lead's knowledge of the skills, or capabilities and experiences, of the testers 304 and 306. The PAM configuration may include information such as the weighting, assigned by the test lead 302, of the importance of factors for each script. The test lead 302 may set the level of the weighting using a user interface of the prioritization and assignment manager 130. The prioritization and assignment manager 130 uses the skills and PAM configurations 310 and 312 to form a PAM queue 314 and to determine which script 320 or 322 is distributed to which tester 304 or 306.

The PAM queue 314 may be a list of the scripts in order of the priority for execution. The more urgent scripts to be executed are at the top of the list. The prioritization and assignment manager 130 determines the order of the scripts within the PAM queue 314 based on the PAM configuration 312. The PAM queue 314 receives, from the testing tool 330, scripts that are scheduled for release. The testing tool 330 may be a commercially available testing tool such as HP Quality Center™.

When the testers access the get next feature 340 via a user interface, the prioritization and assignment manager 130 distributes appropriate scripts 320 and 322 from the PAM queue 314 to the appropriate testers 304 and 306 for execution, respectively. The prioritization and assignment manager 130 determines which script 320 or 322 to distribute to which tester based on the skills, or experience and background, of the testers 304 and 306. Then, the prioritization and assignment manager 130 displays the script 320 or 322 to the assigned tester 304 or 306 through the modular script designer 120. After the scripts are distributed, the prioritization and assignment manager 130 displays to the testers 304 and 306 the details of the assigned scripts 320 and 322.

After reviewing a script 320 or 322, the prioritization and assignment manager 130 allows the testers 304, 306 to select an action from a plurality of actions. The plurality of actions may include, for example, accepting the script 350, deferring the script 351, escalating the script 352, rejecting the script 353, marking the script as out of scope 354 or blocking the script 354. The prioritization and assignment manager 130 may display the plurality of actions to the testers 304, 306 to select from a drop down menu.

For example, if the prioritization and assignment manager 130 assigns a script 320 to a tester 304, and the tester 304 accepts the script 350, the desktop toolbar loads the script for execution 360 and the prioritization and assignment manager 130 changes the status of the script 320 to assign the identification of the tester 304. If the tester 304 defers the script 351, the prioritization and assignment manager 130 prompts the tester 304 to enter information regarding the deferral, including a date and time until which the script should be deferred 361 and a reason for deferring 36. If the tester 304 escalates the script 352 or rejects the script 353, the prioritization and assignment manager 130 prompts the tester 304 to enter information about the escalation, including a reason 362.

If the tester 304 marks the script as out of scope 354, the prioritization and assignment manager 130 prompts the user to choose whether to raise or link to a defect 363, which may be a new defect or an existing defect. If the tester chooses to link a defect, the PAM permits the tester to choose a defect, or defects, to link to the script 364. If the tester 304 blocks the script 355, the prioritization and assignment manager 130 prompts the tester 304 to link the script with a new or existing defect 364, and allows the test lead 302 to un-assign the script 320 and override priority 365 to increase priority of the script 320 and re-assign the script 320.

After the tester 304 enters details or information such as a date/time for deferring a script 361, a reason for escalating or rejecting a script 362, or links a script to a defect after marking a script as out of scope or blocking a script 365, the prioritization and assignment manager 130 lets the tester 304 save the details or information for the script 366 and sends the script back to the PAM queue 314. Alternatively, the tester 304 may choose not to save the details by canceling and closing the script from view 367.

The prioritization and assignment manager 130 is an important element of the next generation testing system 100. The prioritization and assignment manager 130 tracks all of the tests or test scripts in the suite of tests as part of a list in a database and assigns a priority to each of the individual test scripts based on a given set of prioritization factors and assignment factors.

Prioritization factors may be script attributes, including, for example, impact of failure, likelihood of failure, lead time, business priority, estimated effort, and test end date. The prioritization and assignment manager 130 may use prioritization factors to assign a numeric rating to a script for stack ranking, e.g., to evaluate a priority for execution of the script.

Assignment factors may be user attributes evaluated to weight a user against a set of scripts that are available for testing, and may be a numerical value assigned to a script for an individual user. Assignment factors may include, for example, skills required, skills of a tester, status of a script, script workstream, tester workstream, script author, a user's previous experience with a script or its predecessor, and information regarding the tester to whom the script is assigned. The prioritization and assignment manager 130 may use assignment factors to assign a numeric value to a script for an individual user. The priority of a particular test script determines its position in the testing queue. The prioritization and assignment manager 130 may use the prioritization factors and assignment factors together to match and assign a script to a user at the time of a request.

The prioritization and assignment manager 130 provides a centralized automated prioritization of test scripts with real-time assignment logic. All test scripts are prioritized based on a centralized set of factors, which can be configured centrally to influence the entire test operation (for example, to improve performance against KPIs (Key Process Indicators)). The prioritization and assignment manager 130 further provides a skill based assignment, and provides a pull, rather than a push, approach. Testers may click a 'Get Next' icon on their desktop screen to be assigned the next script to execute. The next script is chosen in real-time based on weighted assignment factors.

Each of the factors used to assign priority to the test script may be weighted. In one example, a developer may be presented with a screen having a plurality of sliders or buttons corresponding to each test script. Moving the slider to the right may increase the priority level associated with the corresponding test script, while a moving the slider to the left may decrease the priority level associated with the corresponding test script. Thus, the tester may assign a priority level to a test script based on the tester's judgment and expertise. The prioritization of the various test scripts may affect the relationship and interaction between all of the various test scripts. The prioritization and assignment manager 130 may perform the prioritization function in a batch mode after receiving input from the test script creator.

Some of the factors associated with the assigned priority of the test scripts may have feedback or decision tree capability so that, for example, if a test is performed and returns a failure indication, the prioritization and assignment manager 130 can identify the other test scripts which may be impacted by the failure.

The prioritization and assignment manager 130 also assigns a set of skills to each of the test scripts in the next generation testing system 100 to optimize use of the work force personnel. For example, various test scripts are assigned to testing personnel based on the skill set of the particular testing individual. For example, a tester may click a Get Next button or icon on a screen to request that a new test script be sent to that tester. The prioritization and assignment manager 130 may access a database containing the skill sets of each tester, and assign the next highest priority test script to that tester based on the tester's skill set and the skill set required by the test script, so as to optimize the productivity of the system and the testing personnel overall. Once the tester receives the test script, he or she will run the test script.

The prioritization and assignment manager 130 may also provide a pluggable framework for new factors. New decision factors can be added by defining a new factor class. The factor may be presented through the user interface and can be weighted in the decision logic. This could be used to enable advanced 'Applied Statistic' decision models.

The following table shows a list of PAM configuration factors that may be used in a prioritization and assignment manager 130. Each factor may be associated with a ranking or weighting that may be configured for each project. Rankings may be numbers assigned to elements of a factor, for example, high, medium or low, and may be elements of factors, such as impact of failure (IOF), business priority (BP), and likelihood of failure (LOF) factors. Weightings may be numeric values assigned to the factor itself, and may be a value between 0 and 1 at increments of 0.1. Other implementations may include fewer, additional or other weightings and factors.

| Option | Type | Explanation |
|---|---|---|
| Priority Weighting | Priority | Priority factors are attributes of a script used to assign a script a numeric rating that determines the position of the script in the prioritization queue. |
| Assignment Weighting | Assignment | Assignment factors (AFs) are factors used to assign a script to a tester on demand, based on a set of assignment factors. AF's are based on the skill capabilities of testers and demands on the script. |
| Author Bias Weighting | Assignment | These are project level configuration data factors that are used to normalize ratings to reflect business preferences. Test leads or managers may configure these factors. |
| Home Team Bias Weighting | Assignment | |
| Skills Match Weighting | Assignment | |
| History Bias Weighting | Assignment | |
| Likelihood of Failure Weighting | Priority | |
| Impact of Failure Weighting | Priority | |
| Lead Time Weighting | Priority | |
| Business Priority Weighting | Priority | |
| Include Blocked Scripts | Assignment | |
| Fail Fast Weighting | Assignment | Evaluates a script based on previous failure rates of modules contained in that script. Pass/fail status and defect linkage may be tracked at a module level rather than script level. |
| Module Representation Test | Assignment | This test identifies modules most commonly used within a release and the minimal number of scripts required to cover those modules. This may achieve a high coverage with minimal number of tests. |
| Dynamic Risk Based Testing | Assignment | This test assigns a dynamic Likelihood of Failure rating for a script based on the modular content of that script and the current pass/failure rates of the modules. |
| Exclude Script with Defect | Priority | |

The prioritization and assignment manager 130 may designate a subset of factors that are rated for prioritization and assignment with help from supporting factors. Ratable factors may include, for example: prioritization factors such as impact of failure, likelihood of failure, business priority, and lead time, and assignment factors such as author bias, history bias, home team bias and skills match.

Factors may be divided into types or categories, including: enabler factors, which may be factors that help determine whether a script can be included for assignment consideration, e.g., whether a script can be included in a prioritization queue or an assignment queue; factors for calculating ratings and holding data that are directly used in rating calculations; factor data, which may be factors that provide additional information about a script or user; factor weighting, which may be project level configuration data used to normalize ratings to reflect business preference; and configurable factors, which may be multiple factors that are configurable by test leads or managers.

The following table shows examples of factors, types for each factor, and data source for each factor. Other implementations may include fewer, additional, or other factors, types and sources.

| Factor | Type | Source |
|---|---|---|
| Impact of Failure Factor | Factor/Configurable | NGT/QC |
| Likelihood of Failure Factor | Factor/Configurable | NGT/QC |
| Lead Time Data | Factor/Configurable | NGT |
| Business Priority Factor | Factor/Configurable | NGT |
| EstimatedEffort | Factor | NGT/QC |
| TestSet Open Date | Enabler Factor | QC Lab |
| TestSet Closed Date | Enabler Factor/Factor | QC Lab |
| Skills required | Factor/Enabler Factor | NGT |
| Skills of tester | Factor Data | NGT |
| NGT Status | Enabler Factor | NGT |
| Script Workstream | Factor Data | NGT |
| Tester Workstream | Factor Data | NGT |
| Script Author | Factor Data | NGT |
| Priority Weighting | Factor Weighting/Configurable | NGT |
| Assignment Weighting | Factor Weighting/Configurable | NGT |
| Previous Experience | Factor Data | QC/NGT |
| Assigned To | Factor Data | SQ (NGT) |
| Author Bias Weighting | Factor Weighting/Configurable | NGT |
| HomeTeam Bias Weighting | Factor Weighting/Configurable | NGT |
| Skills Match Weighting | Factor Weighting/Configurable | NGT |
| History Bias Weighting | Factor Weighting/Configurable | NGT |
| Include Blocked Script | Enabler Factor/Configurable | NGT |
| Script Status | Factor Data | NGT/QC |
| Impact of Failure Weighting | Factor Weighting/Configurable | NGT |
| Likelihood of Failure Weighting | Factor Weighting/Configurable | NGT |
| Lead Time Weighting | Factor Weighting/Configurable | NGT |
| Business Priority Weighting | Factor Weighting/Configurable | NGT |
| Release Start Date | Enabler Factor | QC |
| Release End Date | Enabler Factor | QC |
| User Holidays Calendar | Enabler Factor | NGT |

In one embodiment, the prioritization and assignment manager 130 may include a prequeue, a priority queue, an assignment queue, and a status queue. The prequeue may be a list of all scripts in the current release. The priority queue may be a list of scripts sorted in descending order by script prioritization ratings. The assignment queue may be a transitory queue created in the memory of the prioritization and assignment manager 130 when a tester 314 requests a script assignment. The assignment queue may include a subset of the priority queue. The status queue may be a state maintenance table, and may be linked to the priority queue and assignment queue.

The prequeue may store all attributes for each script to support generation of a priority queue and an assignment queue and to improve performance of the prioritization and assignment manager 130. The prioritization and assignment manager 130 determines which scripts to store in the prequeue by the script release start date and script release end date. If the prequeue baseline date falls between the script release start date and the script release end date, then the script is in the current release, and the prioritization and assignment manager 130 stores the script in the prequeue. The prequeue table may store data using common data types, which may be source types translated into common prequeue data types; common status codes, which may be source status codes translated into common PAM status codes; and source to destination column mapping, which may be source columns mapped to common prequeue columns. The prioritization and assignment manager 130 may use the prequeue to connect to external testing systems 638 to extract data from the external testing systems 638 with a provider pattern to load the data into the prequeue table.

The prioritization and assignment manager 130 may determine which scripts to store in the priority queue based on the test set open date and test set closed date for each script. If the priority queue baseline date is between the test set open date and the test set closed date for a script, then the prioritization and assignment manager 130 stores the script in the priority queue. Prioritization ratings may include impact of failure rating, likelihood of failure rating, business priority rating, and lead time rating.

The impact of failure (IOF) rating may be calculated as shown in Equation 1 below.

$$\text{IOF rating} = \text{IOF factor} \times \text{IOF weighting} \quad \text{(Eqn. 1)}$$

The likelihood of failure (LOF) rating may be calculated as shown in Equation 2 below.

$$\text{LOF rating} = \text{LOF factor} \times \text{LOF weighting} \quad \text{(Eqn. 2)}$$

The business priority (BP) rating may be calculated as shown in Equation 3 below.

$$\text{BP rating} = \text{BP factor} \times \text{BP weighting} \quad \text{(Eqn. 3)}$$

The lead time (LT) rating may be calculated as shown in Equation 4 below.

$$\text{LT rating} = (\text{EstimatedEffort} + \text{LT})\text{days} \div ((\text{TestSet closed date}) - (\text{EstimatedEffort} + \text{LT}))\text{days} \times \text{LT weighting} \quad \text{(Eqn. 4)}$$

The NGT priority rating may be equal to the sum of all prioritization ratings. Scripts in the priority queue may be sorted by the NGT priority rating of each script. The prioritization and assignment manager 130 may use the priority queue to assign scripts to a tester on demand, for example, when a tester clicks a Get Next button or icon to request a next script to test.

When a tester requests a next script for testing, the prioritization and assignment manager 130 may generate the assignment queue based on the following enabler factors: skills required, NGT status, exclude blocked script, and calendar. The prioritization and assignment manager 130 may include, in the assignment queue, scripts that have skills required that are part of a user's active skills. The prioritization and assignment manager 130 may also include, in the assignment queue, scripts that have NGT status of rejected, escalated, deferred, assigned, or preassigned. The prioritization and assignment manager 130 may further include scripts that have an exclude block script factor set to "N," indicating that the script is not excluded or blocked.

The prioritization and assignment manager 130 may exclude from the assignment queue scripts that have an estimated test completion date that overlaps with a user holiday calendar, where the estimated completion date (ECD) may be calculated as shown in Equations 5 and 6 below.

$$\text{ECD} = (\text{today's date}) + (\text{total number of days for testing}) \quad \text{(Eqn. 5)}$$

$$(\text{total number of days for testing}) = \text{EstimatedEffort} + \text{LT} \quad \text{(Eqn. 6)}$$

For example, if a user holiday starts on a leave start date and ends on a leave end date, a script may be included in the assignment queue if the estimated completion date falls before, or is less than, the leave start date. But the script is not included in the assignment queue if the estimated completion date of the script is greater than the leave start date.

The prioritization and assignment manager 130 may determine the order in which skills are listed in the assignment queue based on assignment ratings, including, for example, author bias rating, history bias rating, home team bias rating, and skills match rating. The prioritization and assignment manager 130 may determine the author bias rating as follows: if script author is the end user, then author bias rating is equal to author bias weighting; otherwise the author bias rating is zero. History bias may indicate whether a particular user has previously executed a version of the script. The prioritization and assignment manager 130 may determine the history bias rating as follows: if the end user tested the script or a previous version of the script in the past, then the history bias rating is equal to the history bias weighting; otherwise, the history bias rating is zero. The prioritization and assignment manager 130 may obtain script execution history records from the external testing tool, or script execution history records may be stored in a database. The prioritization and assignment manager 130 may determine the skills match rating as follows: select a subset of scripts from the priority queue based on the testing tool instance (e.g., a project within an external testing tool) and, taking into account assignment enabler factors, for each script in the subset the skills match rating is equal to the count of non-mandatory matched skills divided by the count of mandatory skills multiplied by the skills match weighting.

The prioritization and assignment manager 130 may further calculate NGT assignment rating as shown in Equation 7 below.

$$\text{NGT assignment rating} = (\Sigma \text{ assignment ratings} \times \text{assignment weighting}) \times (\text{NGT priority rating} \times \text{NGT priority weighting}) \quad \text{(Eqn. 7)}$$

Scripts in the assignment queue may be sorted in descending order by the NGT assignment rating. The prioritization and assignment manager 130 may assign scripts to a tester in order of NGT assignment rating, beginning with the script with the highest NGT assignment rating.

The prioritization and assignment manager 130 may use the status queue to decouple user actions against an instance of a script during script assignment, or override from queue refreshing. When a script status is assigned or rejected, the prioritization and assignment manager 130 will retain the script state even if the priority queue is dropped or recreated. Script state may refer to PAM attributes associated with a script instance in the priority queue. The status queue may retain the attributes, so that the prioritization and assignment manager may continue to assign scripts while the priority queue is being regenerated.

Figure 4:
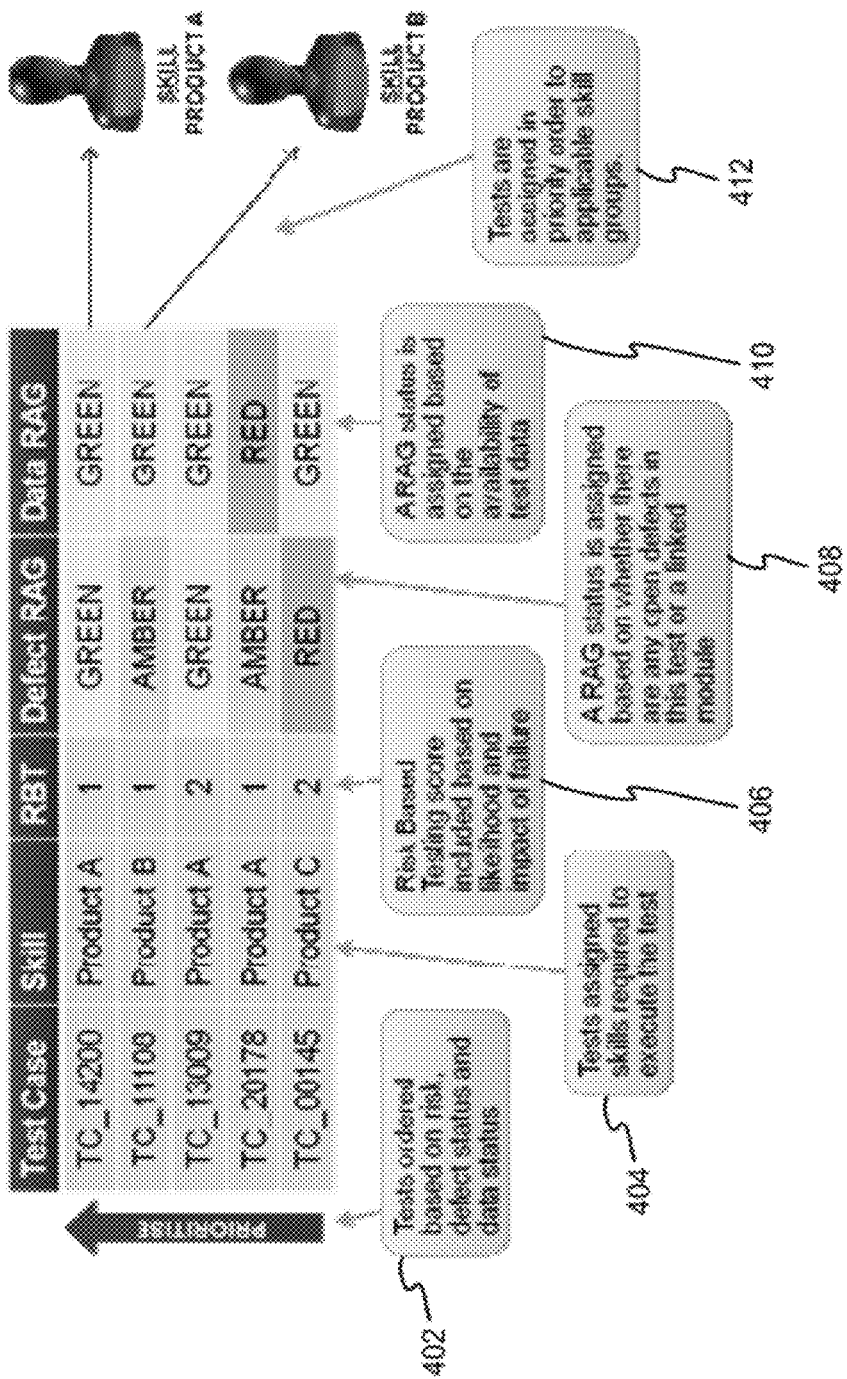
FIG. 4 is a pictorial diagram showing prioritization of test cases in a specific embodiment of a prioritization and assignment manager.

FIG. 4 is a pictorial diagram showing prioritization of test cases in a specific embodiment of a prioritization and assignment manager. The prioritization and assignment manager 130 may order tests based on risk, defect status and data status 402. The prioritization and assignment manager 130 may assign tests based on skills required to execute the test 404. A risk based testing score may be assigned to each test based on likelihood of failure and impact of failure 406. The prioritization and assignment manager 130 may also check the live status of a linked defect or other data type as the time of assignment. The status may be, for example, a Red, Amber or Green (RAG) status based on whether any open defects are in the test or linked to a test module 408. If the test module 408 has a linked defect or has an issue with the linked data type, the prioritization and assignment manager 130 does not assign the test module 408 until the issues are resolved.

The prioritization and assignment manager 130 may prioritize tests according the following characteristics:

Priority based ordering: The ability to prioritize tests based on the Risk Based Testing value associated with each test and the associated business priority;

Defect Impact: Tests that have defects blocking them should be moved to the bottom of the queue and tests with defects against one of the modules in the script should be moved down the queue;

Data Availability: Tests that have no data available should be move to the bottom of the queue and tests with limited data available should be moved down the list;

Skill Based Assignment: Tests may be assigned to testers based on their skills;

Pull Model: The assignment model may be a 'pull' model, e.g., the testers may request their 'next test' through the GUI and the system will assign the next test;

Prep & Execute Assignment: The system may assign both test preparation and execution work to the testers;

Automation Assignment: The ability to assign scripts that are automated to the automation controller rather than sending the script to a manual tester;

Override Priority: Allow test managers to override the priority of certain scripts or scenarios to ensure execution at a particular date or time; and Pre-Requisite Management: Verify that pre-requisites are met before assigning out a script, where prerequisites may include time related requirements (e.g., must be executed out of hours) and dependent script requirements (e.g., must be run after a successful execution of script X).

Figure 5:
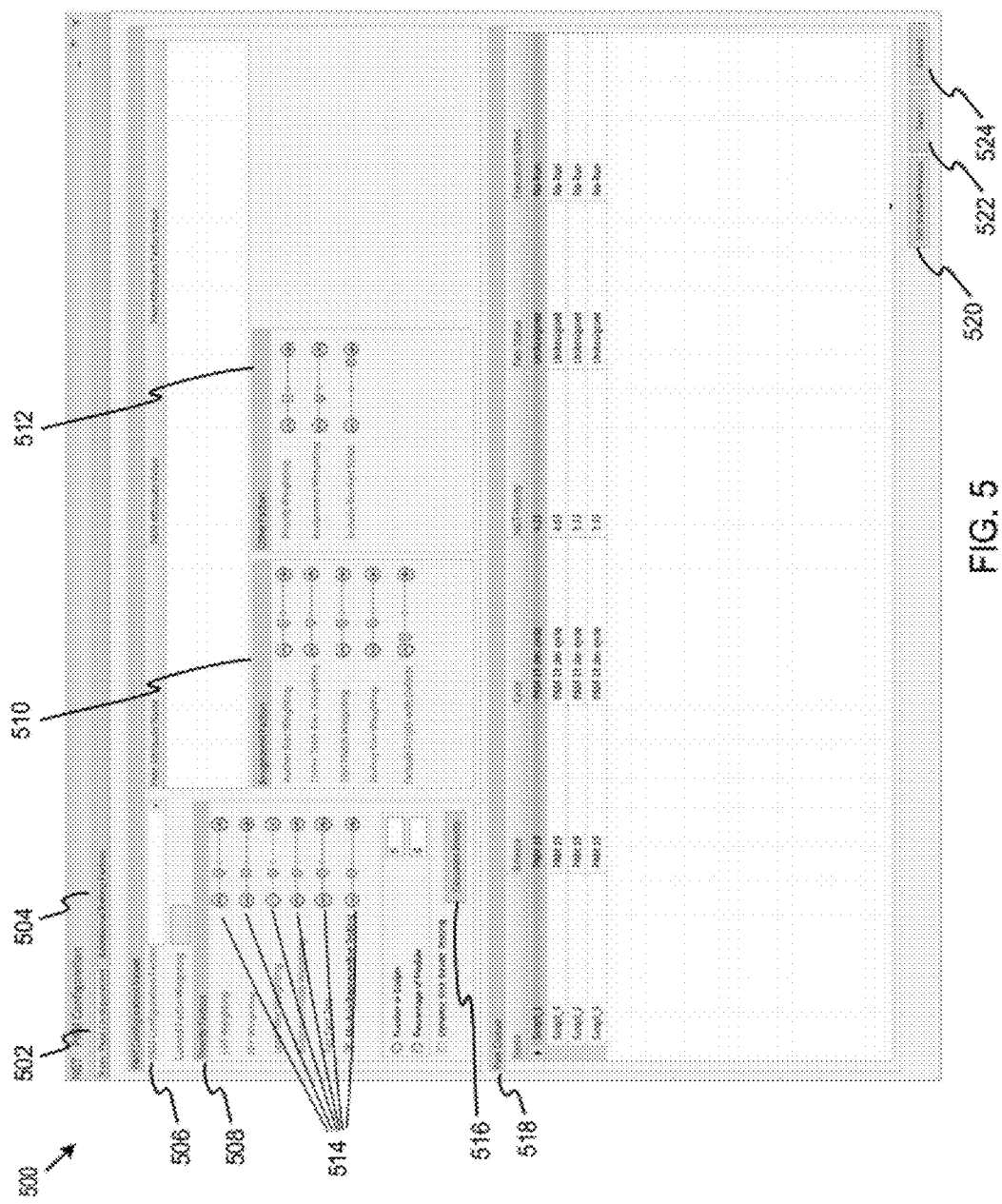
FIG. 5 is a screenshot of a specific embodiment of a prioritization and assignment manager for a next generation testing system.

FIG. 5 is a screen shot of a specific embodiment of the prioritization and assignment manager 130. The user interface 500 may include a plurality of screens, or tabs, including a Basic PAM Configuration tab 502 and an Additional Ratings Factors tab 504, to guide a user through the process of configuring the prioritization and assignment manager 130. The prioritization and assignment manager 130 may prompt the user to select a factor to configure from the PAM Configuration Factor drop down menu 506. Then the user interface 500 displays the details of the selected factor in the priority factors pane 508, the assignment factors pane 510, and the other factors pane 512, and provides sliders, such as sliders for priority factors 514, for the user to set the desired weighting, which may be a value between 0 and 1, in increments of 0.1. The user may repeat this process for additional factors. Then the user may click Calculate Priority 516 and the prioritization and assignment manager 130 updates the PAM queue 518 and displays the list of scripts in order of priority, which the prioritization and assignment manager 130 calculates based on the user configured weightings. Alternatively, the user may click Set Default Values 520 to set all factor weightings to default values. After the user completes the PAM configuration, the user may save the configuration by clicking Save 522, or close the user interface without saving by clicking Cancel 524.

The Additional Factors tab 504 may allow the tester to enter additional information regarding releases. The Additional Rating Factor tab may have a Releases dropdown which includes releases from test tool. The user may select a release from dropdown which displays Release Start Date and Release End Date for the release, and a list of cycles belonging to the release. A Warranty Period (days) dropdown menu may allow the user to set a warranty period of the release, with values from 0-100. Then the prioritization and assignment manager 130 may display on the Additional Factors tab 504 the Release Cycle Name, Release Cycle Priority, Release Cycle Activation and Release Cycle Complexity in columns for each cycle in the release. The Release Cycle Name column may include the name of each cycle. The Release Cycle Priority column may include a textbox to input a value from 0 to 100 (default value is 0), which may indicate the probability of automated assignment of script from that cycle. The Release Cycle Activation column may include a dropdown with values, including: Assign scripts until cycle End Date (allows assignment of script till cycle's end date); Assign scripts past cycle End Date (allows assignment of the script past cycle end date but within warranty period of release); and Don't assign scripts from this cycle (prevents assignment of script in that cycle). The Release Cycle Complexity column may include a dropdown with complexity values, including: Very Complex; Complex; Medium; Simple; and Very Simple. Complexity values may indicate the proficiency level of a skill that is preferred for testing the script. The prioritization and assignment manager 130 may assign a script to a tester who has skills matching the proficiency level indicated. The user may click a Save button to save the selected values of Release Cycles to a database, or a Cancel button to close the tab without saving the selected values.

The prioritization and assignment manager 130 may also process legacy scripts, which are scripts that are not modularized. Modularization is the process of grouping tests into small modules that describe a piece of functionality. The modules combine together to form test scripts or cases. The prioritization and assignment manager 130 may process the legacy scripts through a legacy script user interface. The legacy script user interface may maintain the following factors for legacy scripts: likelihood of failure, impact of failure, lead time, business priority, and script skills required. The legacy script user interface may allow a user to search the QC lab and display legacy scripts to the user, and may allow the user to modify the factors maintained.

The test execution toolbar 140 is a toolbar visible on the tester's computer screen, and provides an indication of every major tool available to the tester, and every major test that the tester may or must invoke. It is conveniently displayed to the tester to increase efficiency. The test execution toolbar 140 may provide in-line test execution. The test execution toolbar 140 allows a tester to load a test, execute the test and record the status from the toolbar. Test scripts can be opened directly within the toolbar, which saves room on a tester's desktop and avoids certain keystrokes, such as ALT-Tabbing, between screens. Defect raising and screen capture may be part of the process. The text execution tool bar 140 may also provide an embedded approvals lists. All module/script approvals may be shown in the toolbar, and an approver can quickly open the relevant script/module for approval. The test execution toolbar 140 also allows quick access to all NGT tools. A quick launch bar may be provided to enable the tester to quickly access all of the NGT tools. The toolbar may also handle login management for NGT. A user profile section is available to change user information. The test execution toolbar 140 is also dockable with an auto-hide function. The test execution toolbar 140 may be docked to the left hand side of the screen, and it can be selected to be visible or auto-hide. An extendable framework allows additional panels to be added to the toolbar. The test execution toolbar 140 may be integrated with the prioritization and assignment manager 130 to allow a tester to request the next test that should be run.

The automation controller 150 is an application that may run on a virtual machine, such as in a server farm, or a computing machine in a "cloud" environment. The automation controller 150 may communicate with the prioritization and assignment manager 130 to request the next test script in the testing queue, and facilitate opening of the test script using the basic testing tool described above, such as HP Quick Test Pro.

The automation controller 150 may execute the test script using the basic testing tool, and record the results back into the basic testing tool. The next test script is then requested and the process is repeated. The automation controller 150 further provides modular design and partial automation. Automation scripts may be developed as modules, and each automation module may have one or more manual modules mapped against it. Partial automation enables rapid execution of automated parts of scripts. Essentially, the automation control 150 is used where applicable to automate the execution of test scripts.

An additional feature of the automation controller 150 seeks to maximize the "return on investment" or "ROI" associated with each test script that is run automatically. The automation controller 150 selects for automation the test scripts that provide the greatest ROI collectively. The choice whether to automate a particular test script using the automation controller 150 may be based on the ROI associated with the test script. For example, a particular test script may be a test script that handles initial login by a user. Because a test script that handles initial login by user may be used by hundreds of different test scripts without variation, this testing script provides a high ROI, and as such, may be a good candidate for automation. The ROI essentially is a measure of increased efficiency attained by automation of the test script.

The test data supply chain 160 creates a mapping between the test script and the type or quantity of data that is required by the test script in order to execute properly. When the test script is created using the modular script designer 120, the creator specifies the type of data that is required for the test script and specifies the type of output data generated as a result of running the test script, essentially quantifying the input and output parameters of the test script. As different test scripts are added to the queue of test scripts to be handled by the prioritization and assignment manager 130 and executed thereafter, the test data supply chain 160 organizes the test scripts in an efficient manner so as to optimize management of the input data required by the corresponding test script.

The test data supply chain 160 may provide a data catalogue. Data types are modeled and stored in a database. The test data team can check data in and out of the catalogue. Also, rules can be specified to enable basic data mining. The test data supply chain 160 also provides mapping data to test scripts. During preparation, the data type required is selected against the script. Also, using the modular script designer 304, data parameters can be mapped directly to script parameters to allow automated assignment at run-time. The test data supply chain 160 further provides monitoring of 'stock levels' and re-ordering. The test data supply chain 160 can monitor demand versus capacity for all types of data, and as data gets 'used' by test scripts, the levels are updated. The test data supply chain 160 can order additional data from the data team or via an automated provision. The test data supply chain 160 may also be integrated with the PAM 306. The stock levels can be used during prioritization to avoid running scripts that do not have available test data or where stock levels are low.

For example, if fifty specific test scripts require input data type "A" and twenty-seven specific test scripts require input data type "B," the test data supply chain 160 may organize the required data types for each script and provides the data to the test script in a "just-in-time" manner to avoid redundancy and reduce complexity. Further, such test data may change throughout the lifecycle of the testing process based on the results of a particular test. Accordingly, the test data supply chain 160 tracks the required changes and updates the data sets required for the corresponding test scripts so that as the test scripts are being executed, up-to-date test data is available to the test script.

The reporting portal 170 handles the reporting functions for the next generation testing system 100. The reporting portal 170 may be based on the Microsoft Business Intelligence system, which is a commercially available software package. The reporting portal 170 also includes an off-line data warehouse ("DW") to avoid testing tool degradation. An off-line DW may be maintained to avoid queries directly on the external testing tool. A dimension based data model is used for simplified reporting. Further, data is pre-aggregated in a multidimensional online analytical processing ("MOLAP") database to provide quick analysis. The reporting portal 170 further provides cube-based metrics and KPIs. Using SS Analysis Services, measures and targets may have been pre-defined, which can be included into reports. PowerPivot, a spreadsheet add-in available from Microsoft Corporation, allows data to be quickly analyzed in spreadsheet programs, such as Microsoft Excel™ for ad-hoc reports. Further, the reporting portal 170 provides integration with solutions, such as Microsoft SharePoint™. Where data from systems other than the HP Quality Center™ is required (for example, financial/production data), the solution can receive data from solutions, such as Microsoft SharePoint™. The SSIS component allows the solution to be easily extended to direct data sources where required. The reporting portal 170 provides an interface to the various modules of the next generation testing system 100 and handles all of the report generation, report format manipulation, and other reporting functions.

The defect management tool 180 permits each testing individual to quickly identify and track defects in the testing process. When raising new defect, various fields of the defect will be pre-populated based on the current test that is being executed. The defect management tool 180 may simplify the process for raising, tracking and updating defects. The defect management tool 180 may provide a defect watch list. Toolbar based list of defects with real-time Red, Amber or Green (RAG) status indicators may be provided. Red status indicates that a defect is not actively being resolved; amber status indicates that the defect is in the process of being resolved, and green indicates that the defect is resolved. The defect management tool 180 may allow quick access to full information of the defects to see the latest status. The defect management tool 180 may also provide in-line defect raising with test history. While executing a test through the toolbar, screenshots and test steps may be captured. When a defect is raised, this information is pre-populated in the defect. Screenshots and other attachments can be uploaded directly. The defect management tool 180, also reduces "alt-tab" operations. By including core defect management in the toolbar, the defect management tool 180 is able to reduce the need to "alt-tab" into an external testing system, such as the HP Quality Center™. The defect management tool 180 also enables automated un-blocking of scripts to further avoid time spent in the external testing system. The defect management tool 180 further provides team based views. Managers have a 'team view' to enable them to see the defects currently impacting their team with the relevant size and status.

Figure 6:
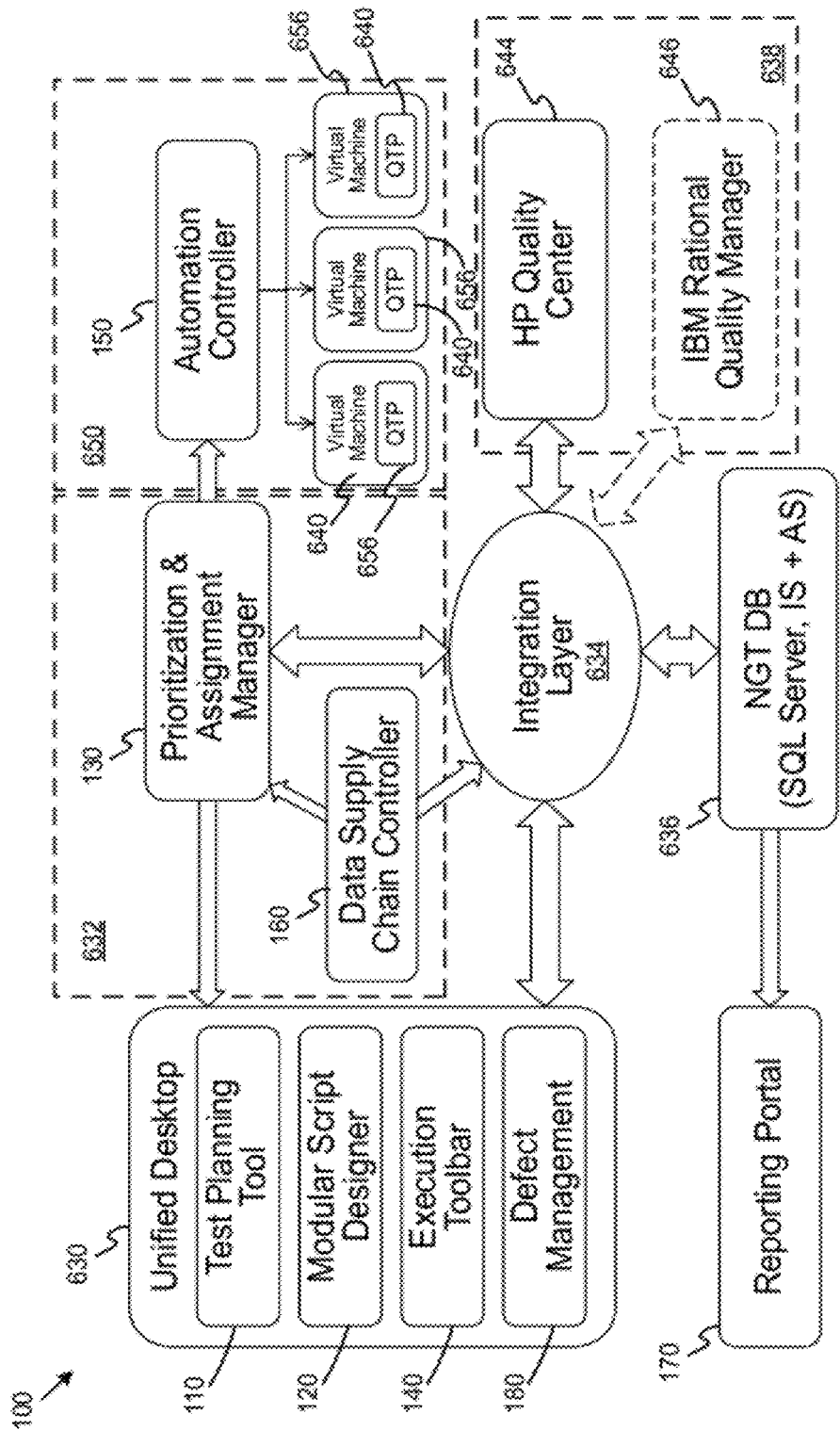
FIG. 6 is a high-level block diagram showing the environment in which the next generation testing system operates.

FIG. 6 is a high-level block diagram showing the machine environment in which the next generation testing system 100 may run, and the interconnection between the various hardware and software components. Each testing individual may have a dedicated PC or other computer, referred to as the unified desktop 630. The unified desktop 630 may include various modules of the next generation testing system 100, such as the test planning tool 110, the modular script designer 120 the execution toolbar 140 and the defect management tool 180, running as a ".Net" client.

The prioritization and assignment manager 130, test data supply chain 160 and its associated controller may reside on a server 632 or central server, along with a workflow system configured to schedule and handle execution of various tasks. However, multiple servers may also be used. The workflow system may be provided by Microsoft Windows Workflow Foundation, which also may execute on one or more of the servers.

An integration layer 634 provides communication and functionality between the unified desktop 630, a database 636, the prioritization and assignment manager 130, and the test data supply chain 160. The database 636 stores all of the test scripts and other required data. The integration layer 634 may be a "dll" file resident on the servers 632 and on the client machine, such as the unified desktop 630, and functions as a common API interface. The integration layer 634 is decoupled from the downstream basic testing tools 638, such as an HP Quality Center™ tool 644 or an IBM Rational Quality Manager 646 by virtue of a pluggable architecture.

The prioritization and assignment manager 130 and the test data supply chain 160 and its associated controller execute under the workflow system, which resides on the server 632. The automation controller 150 preferably resides on a separate and independent server or set of servers 650. The server that runs the automation controller 150 may be similar to the computer that runs the unified desktop 630 because the automation controller 150 essentially emulates the unified desktop when executing test scripts.

The automation controller 150 receives the prioritized test scripts from the prioritization and assignment manager 130, and accesses multiple virtual machines 640 to perform its tests. The virtual machines 640 may be "cloud-based" machines. Each virtual machine 640 includes a functional automation tool, such as Hewlett Packard's HP Quick Test Pro, referred to as QTP, which receives the test script from the prioritization and assignment manager 130 and then executes the actual test script. Results from the test are reported back through the integration layer 634.

The next generation testing system and 100 may be embodied as a system cooperating with computer hardware components and/or as computer-implemented methods. The next generation testing system 100 may include a plurality of software modules or subsystems. The modules or subsystems, may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

Figure 7:
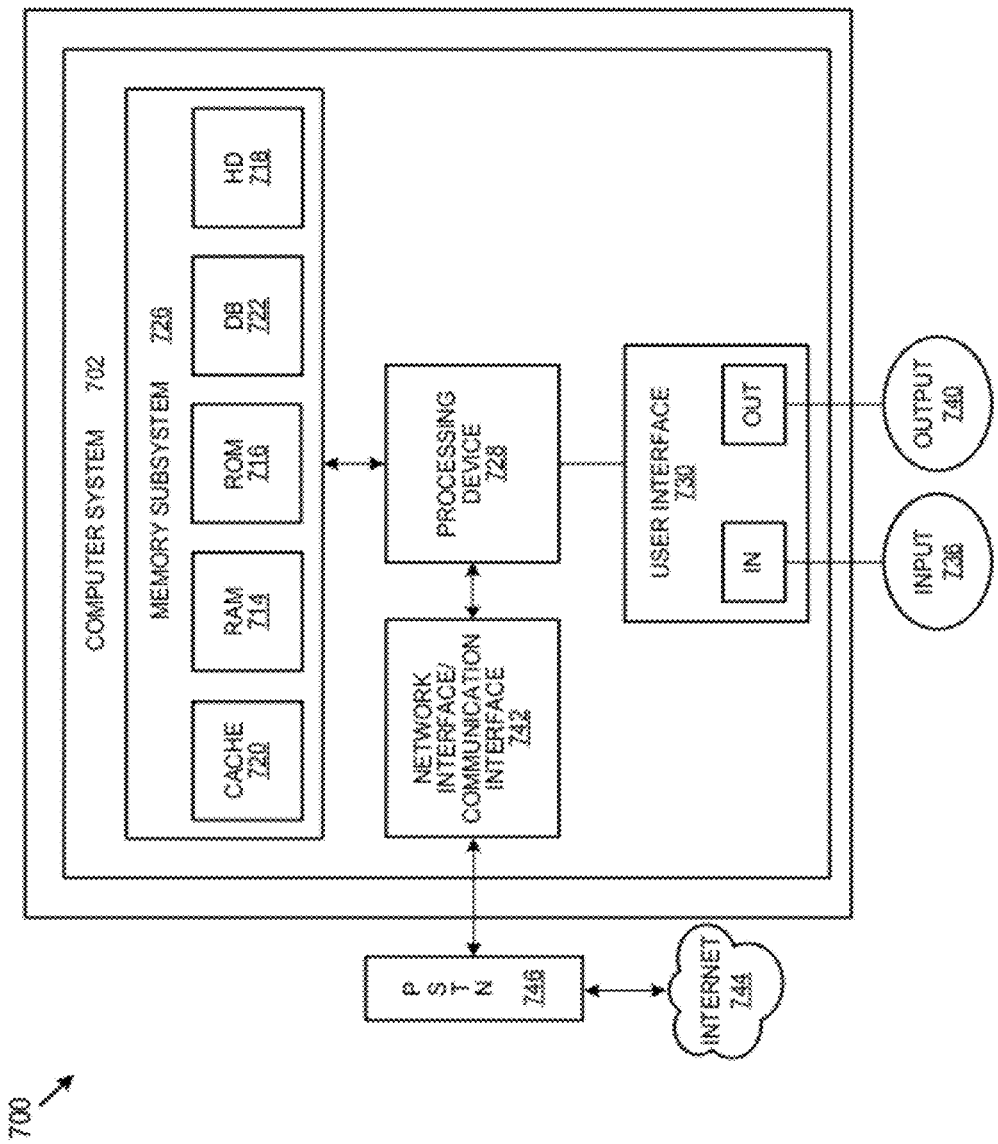
FIG. 7 is a high-level block diagram of a computer system.

FIG. 7 is a high-level hardware block diagram of one embodiment of a computer or machine 700, such as the server 632 and 650, the PC executing the unified desktop 630, and the virtual machines 640. The next generation testing system 100 may be embodied as a system cooperating with computer hardware components and/or as computer-implemented methods. The next generation testing system 100 may include a plurality of software modules or subsystems. The modules or subsystems may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

The computer or machine 700 may be a personal computer or a server and may include various hardware components, such as RAM 714, ROM 716, hard disk storage 718, cache memory 720, database storage 722, and the like (also referred to as "memory subsystem 726"). The computer 700 may include any suitable processing device 728, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 728 may be an Intel Pentium® microprocessor, x86 compatible microprocessor, or equivalent device, and may be incorporated into a server, a personal computer, or any suitable computing platform.

The memory subsystem 726 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 730 may be coupled to the computer 700 and may include various input devices 736, such as switches selectable by the system manager and/or a keyboard. The user interface also may include suitable output devices 740, such as an LCD display, a CRT, various LED indicators, a printer, and/or a speech output device, as is known in the art.

To facilitate communication between the computer 700 and external sources, a communication interface 742 may be operatively coupled to the computer system. The communication interface 742 may be, for example, a local area network, such as an Ethernet network, intranet, Internet, or other suitable network 744. The communication interface 742 may also be connected to a public switched telephone network (PSTN) 746 or POTS (plain old telephone system), which may facilitate communication via the Internet 744. Any suitable commercially-available communication device or network may be used.

Figure 8:
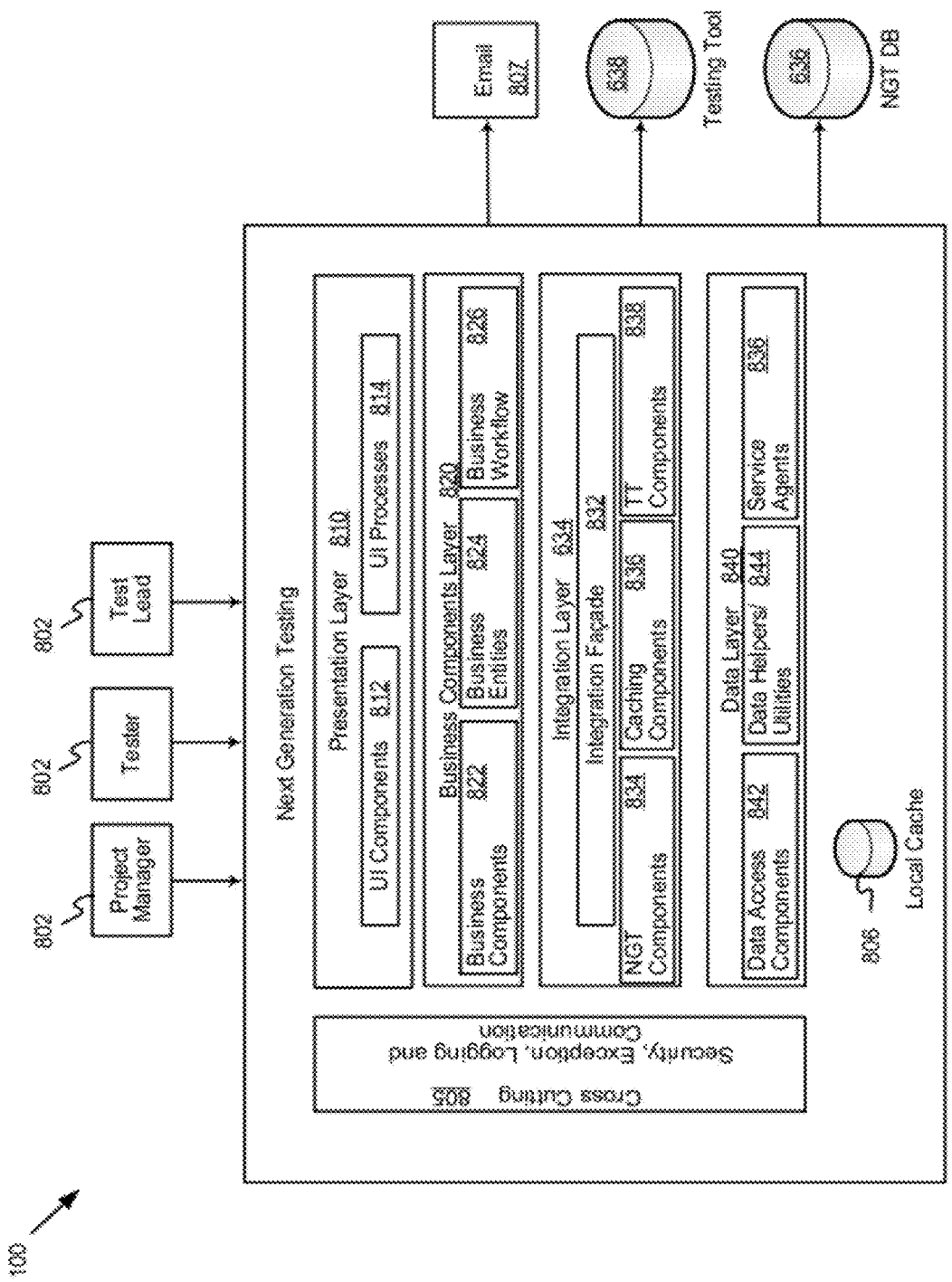
FIG. 8 is a pictorial diagram of an embodiment of the NGT system.

FIG. 8 shows a conceptual diagram of an embodiment of the NGT system 100. As shown in FIG. 8, the NGT system 100 may include a presentation layer 810, a business component layer 820, the integration layer 634, and a data layer 840. The presentation layer 810 includes user interface (UI) components 812 which render and format data for display to users 802, including project managers, testers, and test leads, and acquire and validate data that users 802 enter. The presentation layer 810 also includes UI process components 814 that drive the process using separate user process components to avoid hard coding the process flow and state management logic in the UI elements themselves. The business components layer 820 implements business logic and workflow. The business components layer 820 includes business components 822 which implement the business logic of the application. The business components layer 820 also includes business entities 824 and business workflow 826. Business entities are data transfer objects in the business components layer 820. These are common objects that can be used across the layers, including the presentation layer 810, to pass data around.

Integration layer 634 provides backend agnostic access to the upstream layers (business components layer 820 and presentation layer 810), and enables plug-ability via a common interface to one or more backend systems such as QC, Rational and Team Foundation Server. Integration layer 634 implements the following design pattern: an abstract base class inherits from ProvideBase (which is a class available with Microsoft's .Net framework); each concrete implementer in turn inherits from the abstract class above; Appropriated Provider (which may be an NGT component that communicates with a backend system, such as QC) is loaded based on type definition in a .config file. The integration layer 634 also includes the integration façade 832. Integration façade 832 exposes a simplified interface to the business components layer 820, and reads data from a combination of data transfer objects from one or more backend repository or cache (e.g., Windows Server R2) and merges them to a common super data transfer object to return to the business components layer 820. Integration layer 634 also includes NGT components 834 which interface between the integration façade 832 and the data layer 840 and may provide mapping functionality for the integration layer 634 if required. The integration layer 634 also includes caching components 836 and testing tool components 838. Testing tool components 838 are providers servicing requests for data read/write from a Testing Tool 804.

The data layer 840 includes data access components 842 which centralize the logic necessary to access underlying NGT data store, exposing methods to allow easier and transparent access to the database. It also includes data helper/utilities 844 which are used to centralizing generic data access functionality such as managing database connections. The data layer 840 also includes service agents 836 which provide Windows Communication Foundation services proxy for talking to application server services. The data layer 840 may be an Enterprise Library Data Access Application Block or a custom designed data layer. Alternatively, object relational mapping tools, such as Entity Spaces (available from EntitySpaces, LLP), Genome (available from TechTalk, GmbH), LINQ-to-SQL (available from Microsoft Corporation), Entity Framework (also available from Microsoft Corporation), or LLBLGen Pro (available from Solutions Design), may be used to generate the data layer 840 components.

Cross cutting functions 805 in the NGT 100 may include, for example, security, exceptions handling, locking, and communication. The NGT 100 may also include a local cache 806. Outputs from the NGT 100 may include, for example, email functionality 807 or other information communication functionality. Emails may include notifications to testers regarding script rejection or approval, notifications to approvers regarding scripts that are ready for review, and notifications regarding security concerns, system exceptions, and auditing. The NGT 100 may also communicate information to testing tool 330 and an NGT database 636.

Figure 9:
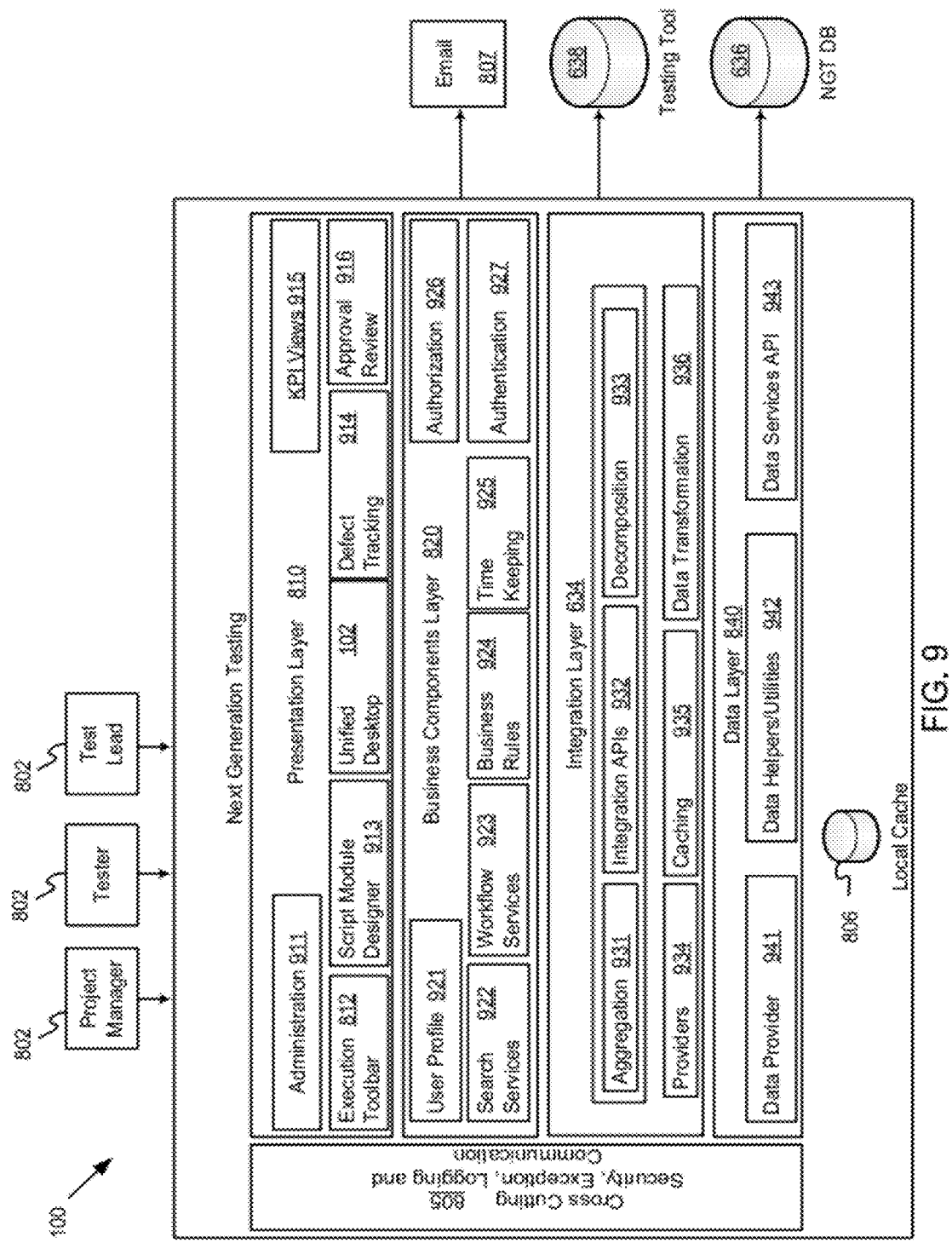
FIG. 9 is a pictorial diagram of an embodiment of the NGT system.

FIG. 9 shows a logical diagram of an embodiment of the NGT system 100. In the embodiment, the presentation layer 1410 may include a plurality of UI components 1412 and UI processes 1414, including an administration interface 911, an execution toolbar 912, a script module designer 913, a unified desktop 102, a defect tracking interface 914, KPI views 915, and an approval review interface 916. The business components layer 1420 may include a plurality of components, including a user profile component 921, a search services component 922, a workflow services component 923, a business rules component 924, a time keeping component 925, an authorisation component 926, and an authentication component 927. The integration layer 634 may include an integration façade 1432, which may include aggregation 931, integration APIs 932, and decomposition 933. The integration layer 634 may also include providers 934, caching 935, and data transformation 935. The data layer 1440 may provide access to a data provider 941, data helper/utilities 942, and data services API 943.

Figure 10:
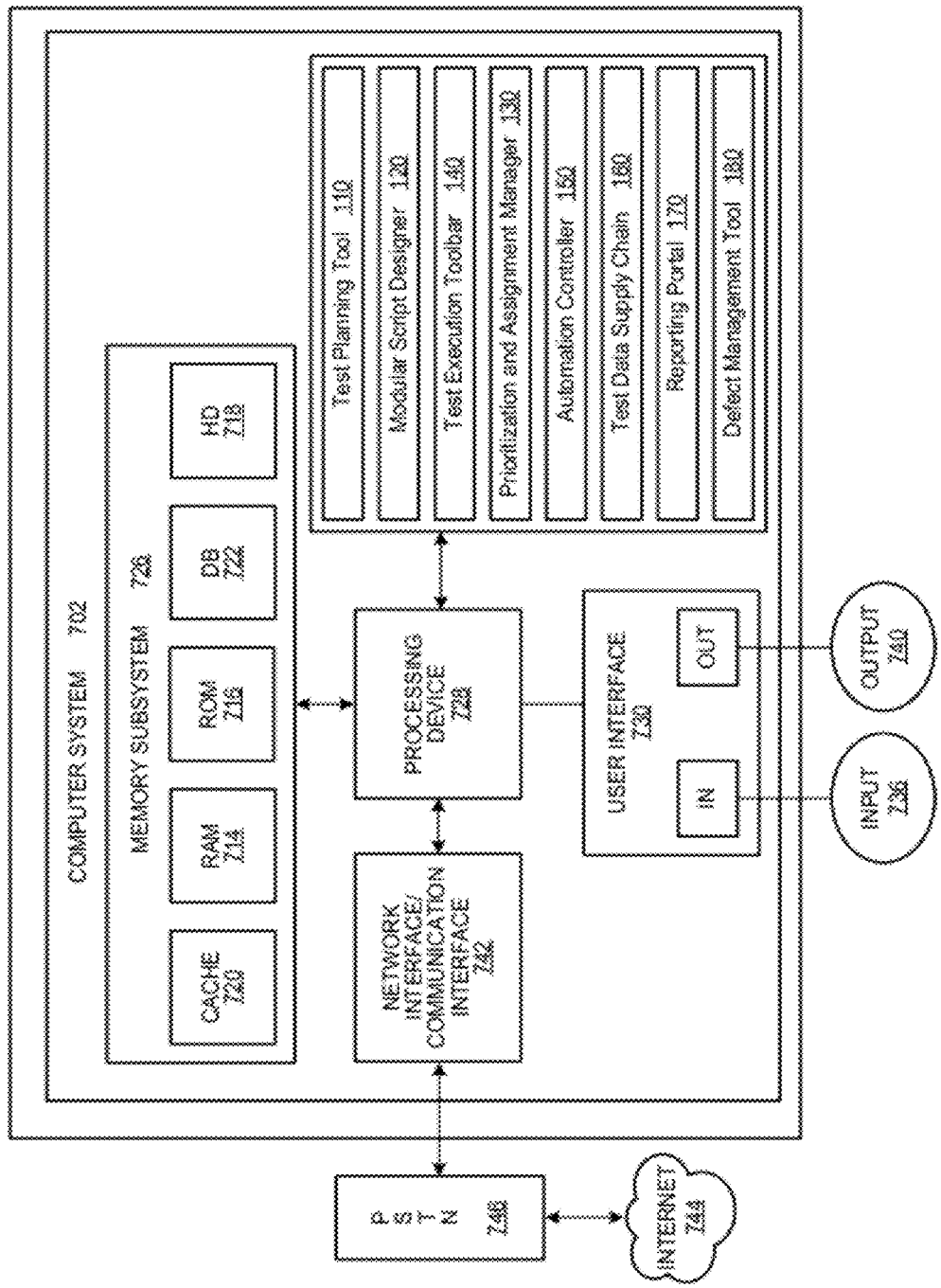
FIG. 10 is a high-level hardware block diagram of another embodiment of the NGT system.

FIG. 10 is a high-level hardware block diagram of another embodiment of the NGT system. The NGT system 100 and its key components 110, 120, 130, 140, 150, 160, 170, and 180 may be embodied as a system cooperating with computer hardware components, such as a processing device 728, and/or as computer-implemented methods. The NGT system 100 may include a plurality of software components or subsystems. The components or subsystems, such as the test planning tool 110, the modular script designer 120, the prioritization and assignment manager 130, the test execution toolbar 140, the automation controller 150, the test data supply chain 160, the reporting portal 170, and/or the defect management tool 180, may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method of prioritizing and assigning test scripts in an integrated testing platform, the testing platform configured to organize, manage, and facilitate debugging of test scripts prepared by a plurality of testing individuals, the method comprising:
receiving a plurality of test scripts;
applying a predetermined set of prioritization factors to each test script, the prioritization factors including at least two of: an impact of failure, a likelihood of failure, a lead time, a business priority, an estimated effort, and a test end date;
assigning a weight value to each prioritization factor based on relative importance of the prioritization factor;
setting a priority value for each test script based on the weighted prioritization factors corresponding to the test script;
assigning the test script to a position in a plurality of queues for subsequent execution based on the corresponding priority value, the assigned test script associated with one or more bias factors, the queues including a pre-queue, a priority queue, and an assignment queue;
selecting a subset of test scripts from the priority queue, wherein each test script has a skills match rating that is proportional to a count of non-mandatory matched skills divided by a count of mandatory skills, and the test scripts have an exclude block script factor set to be "N"; and
identifying a selected test script from the subset of test scripts in the assignment queue and forwarding the selected test script to a testing individual if the bias factors indicate that requirements of the test script match the corresponding bias factors of the testing individual.

2. The method according to claim 1, wherein the predetermined set of factors comprises assignment factors and prioritization factors, and wherein the assignment factors are based on attributes of the testing individual and the prioritization factors are based on attributes of the test script.

3. The method according to claim 1, wherein the priority value is set for each test script in a batch mode process.

4. The method according to claim 1, wherein the bias factors include an indication of a skill set required by the test script, and an indication of the skill set possessed by testing individual.

5. The method according to claim 1, wherein the bias factors include history bias that indicates whether the test individual has previously executed a version of the selected test script.

6. The method according to claim 1, wherein the priority value is set in real-time.

7. The method according to claim 1, wherein the testing individual is assigned a test script in real time when requested by the testing individual.

8. A system for prioritizing and assigning test scripts in an integrated testing platform, the testing platform configured to organize, manage, and facilitate debugging of test scripts prepared by a plurality of testing individuals, the system comprising:
a computer processor coupled with a memory, a network interface, a user interface and a prioritization and assignment manager component, wherein the prioritization and assignment manager component is operable to:
receive, at the network interface, a plurality of test scripts from the computer processor;
apply, at the computer processor, a predetermined set of prioritization factors to each test script, the applied predetermined set of prioritization factors being stored on the memory, the prioritization factors including at least two of: an impact of failure, a likelihood of failure, a lead time, a business priority, an estimated effort, and a test end date;
assign, at the computer processor, a weight value to each prioritization factor based on relative importance of the factor;
set, at the computer processor, a priority value for each test script based on the weighted prioritization factors corresponding to the test script;
assign, at the computer processor, the test script, for subsequent execution on the computer processor, to a position in a plurality of queues based on the corresponding priority value, the assigned test script associated with one or more bias factors, the queues including a pre-queue, a priority queue, and an assignment queue;
select a subset of test scripts from the priority queue, wherein each test script has a skills match rating that is proportional to a count of non-mandatory matched skills divided by a count of mandatory skills, and the test scripts have an exclude block script factor set to be "N"; and
identify a selected test script from the subset of test scripts in the assignment queue and forwarding, via the user interface, the selected test script to a testing individual if the bias factors indicate that requirements of the test script match the corresponding bias factors of the testing individual.

9. The system according to claim 8, wherein the predetermined set of factors comprises assignment factors and prioritization factors, and where the assignment factors are based on attributes of the testing individual and the prioritization factors are based on attributes of the test script.

10. The system according to claim 8, wherein the priority value is set for each test script in a batch mode process.

11. The system according to claim 8, wherein the bias factors include an indication of a skill set required by the test script, and an indication of the skill set possessed by testing individual.

12. The system according to claim 8, wherein the bias factors include history bias that indicates whether the test individual has previously executed a version of the selected test script.

13. The system according to claim 8, wherein the priority value is set in real-time.

14. The system according to claim 8, wherein the testing individual is assigned a test script in real time when requested by the testing individual.

15. A method of prioritizing and assigning test scripts in an integrated testing platform, the testing platform configured to organize, manage, and facilitate debugging of test scripts prepared by a plurality of testing individuals, the method comprising:

receiving a plurality of test scripts;

applying a predetermined set of factors to each test script, the factors including prioritization factors based on script attributes and assignment factors based on attributes of a testing individual, the prioritization factors including at least two of: an impact of failure, a likelihood of failure, a lead time, a business priority, an estimated effort, and a test end date;

assigning a weight value to each factor based on relative importance of each factor;

setting a priority rating value for each test script, the priority rating value being based on weighted priority factors corresponding to each test script;

setting an assignment rating value for each test script, the assignment rating value being based on the corresponding priority rating value corresponding to weighted factors;

determining a subset of test scripts based on attributes of the testing individual and attributes of each test script, wherein each test script of the subset of test scripts has a skills match rating that is proportional to a count of non-mandatory matched skills divided by a count of mandatory skills, and the test scripts have an exclude block script factor set to be "N";

saving each test script in a plurality of queues, the queues including a pre-queue, a priority queue, and an assignment queue; and assigning, based on the corresponding assignment rating value, each test script in the subset of test scripts to a position in the assignment queue for subsequent assignment to the testing individual.

16. The method according to claim 15, wherein the priority rating value is set for each test script in a batch mode process.

17. The method according to claim 15, wherein script attributes include testing skills required and expected completion date, and attributes of the testing individual include testing skills of the testing individual or a holiday calendar of the individual.

18. A system for prioritizing and assigning test scripts in an integrated testing platform, the testing platform configured to organize, manage, and facilitate debugging of test scripts prepared by a plurality of testing individuals, the system comprising:

a computer processor; and a memory in communication with the computer processor, the memory comprising logic for a prioritization and assignment manager component, where the logic when executed by the computer processor causes the processor to:

receive a plurality of test scripts;

apply a predetermined set of factors to each test script, the factors including prioritization factors based on script attributes and assignment factors based on attributes of a testing individual, the prioritization factors including at least two of: an impact of failure, a likelihood of failure, a lead time, a business priority, an estimated effort, and a test end date;

assign a weight value to each factor based on relative importance of the factor;

set a priority rating value for each test script, the priority rating value being based on weighted priority factors corresponding to each test script;

set an assignment rating value for each test script, the assignment rating value being based on the corresponding priority rating value corresponding to weighted factors;

save, each test script in a plurality of queues, the queues including a pre-queue, a priority queue, and an assignment queue;

select a subset of test scripts from the priority queue, wherein each test script has a skills match rating that is proportional to a count of non-mandatory matched skills divided by a count of mandatory skills, and the test scripts have an exclude block script factor set to be "N"; and assign, based on the corresponding assignment rating value, the subset of test scripts to a position in the assignment queue for subsequent assignment to the testing individual, where the subset of test scripts is determined based on attributes of the testing individual and attributes of the scripts.

19. The method according to claim 15, wherein the priority rating value is set for each test script in a batch mode process.

20. The method according to claim 15, wherein script attributes include testing skills required and expected completion date, and attributes of the testing individual include testing skills of the testing individual or a holiday calendar of the individual.

21. The method according to claim 1, further comprising:

obtaining skill configuration information for at least two testing individuals; and wherein identifying the selected test script includes using the skill configuration information for the at least two testing individuals.

* * * * *